(12) United States Patent
Kulesha

(10) Patent No.: US 7,862,679 B2
(45) Date of Patent: Jan. 4, 2011

(54) INTEGRAL DOUBLE BAG FOR VACUUM BAGGING A COMPOSITE PART AND METHOD OF USING THE SAME

(75) Inventor: Richard L. Kulesha, Bear, DE (US)

(73) Assignee: The Boeing Company, Chicago, IL (US)

( * ) Notice: Subject to any disclaimer, the term of this patent is extended or adjusted under 35 U.S.C. 154(b) by 1181 days.

(21) Appl. No.: 11/501,363

(22) Filed: Aug. 9, 2006

(65) Prior Publication Data

US 2008/0048369 A1    Feb. 28, 2008

(51) Int. Cl.
*B29C 65/00* (2006.01)
(52) U.S. Cl. .......................... 156/285; 264/101
(58) Field of Classification Search .................. 156/285, 156/286, 381, 382; 264/571, 101, 102
See application file for complete search history.

(56) References Cited

U.S. PATENT DOCUMENTS 5,358,785 A * 10/1994 Akao et al. ................. 428/349
5,618,606 A * 4/1997 Sherrick et al. ............. 428/113
2003/0188821 A1* 10/2003 Keller et al. .................. 156/94
2005/0253309 A1* 11/2005 Hou et al. .................... 264/571

OTHER PUBLICATIONS

Associated Bag Company—Single Ply Autoclavable Polypropylene Bag 1.25mil.
www.about.com—Composites & Plastics: Vacuum Bagging: basics. http://www.acp-composites.com/home.php?cat=4752.

* cited by examiner

*Primary Examiner*—John L Goff
(74) *Attorney, Agent, or Firm*—Tung & Associates

(57) ABSTRACT

Composite parts such as plastic laminates are formed using a pre-assembled, integral double bag to vacuum bag the part. The double bag is formed of two sheets of bag material that are cut to pre-determined width dimensions, with the width of one sheet being less than that of the other. The bag sheets are prealigned and then attached to each other by spaced apart bonds between the sheets which hold the bag sheets in registered relationship to each other when the double bag is placed over the part and sealed to a tool base. The attachment bonds may be formed by ultrasonic welding, heat sealing or an adhesive.

16 Claims, 4 Drawing Sheets

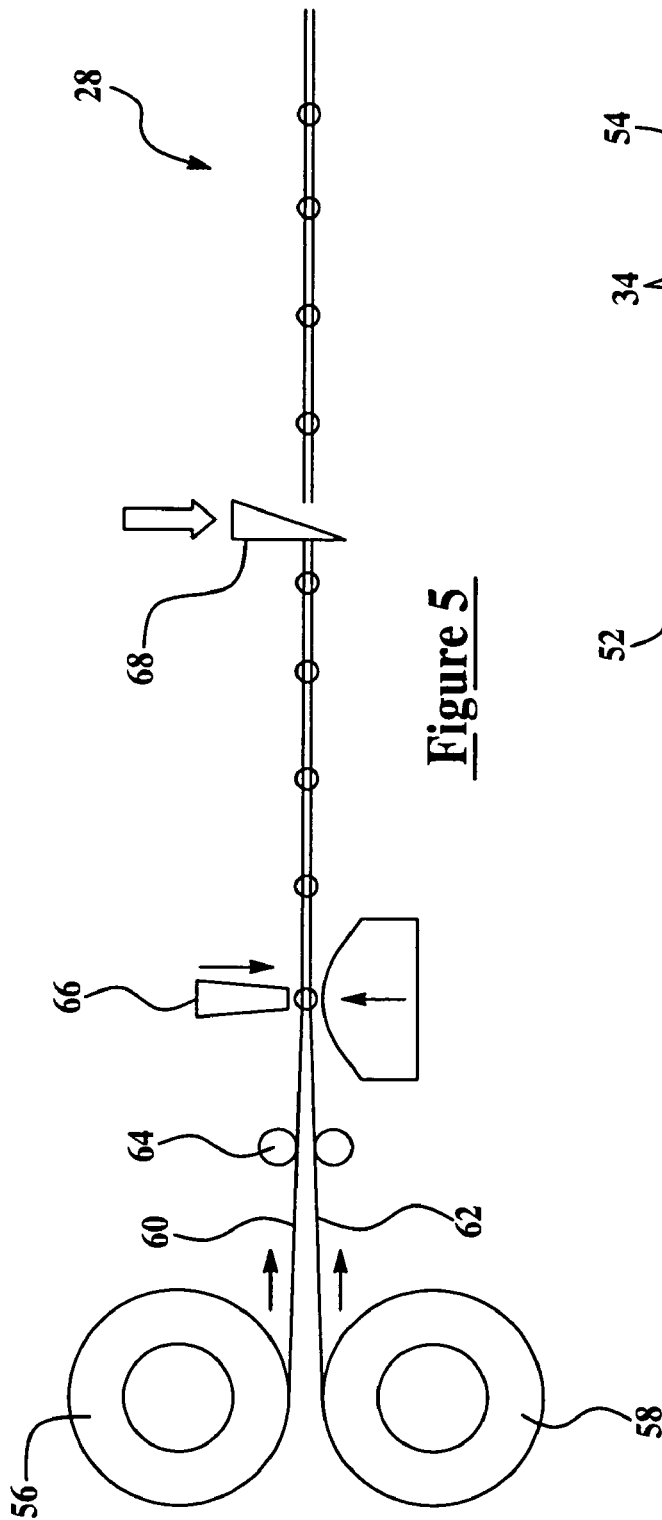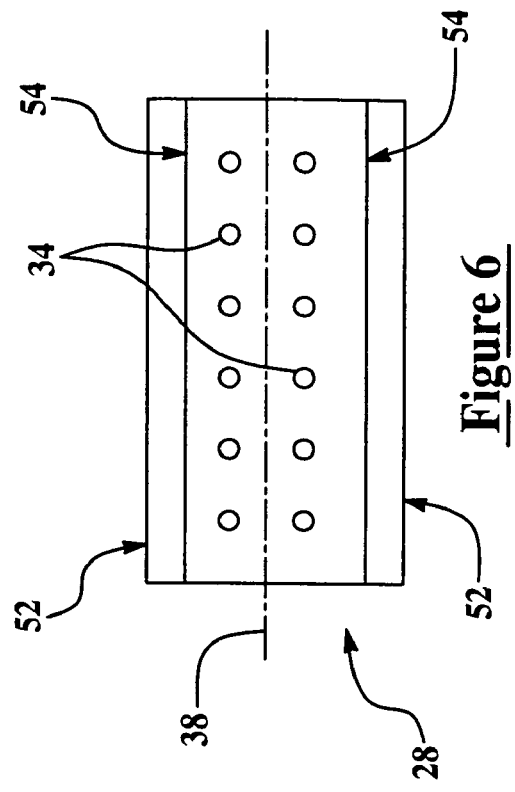

INTEGRAL DOUBLE BAG FOR VACUUM BAGGING A COMPOSITE PART AND METHOD OF USING THE SAME

FIELD OF THE INVENTION

This invention generally relates to methods and equipment used to manufacture composite parts, such as plastic laminates, and deals more particularly with an integral double bag and related method for bagging the parts during compaction.

BACKGROUND OF THE INVENTION

Composite structures are widely used in high performance applications because of their light weight, high strength, high stiffness and superior fatigue resistance. These structures broadly comprise a combination of dissimilar constituent materials bonded together by a binder, but are most commonly formed by a thermosetting resin matrix in combination with a fibrous reinforcement, typically in the form of a sheet or mat. Multiple plies of the matting are impregnated with a binder such as epoxy plastic resin or polyester resin, and formed into a "lay-up". Pressure and heat are applied to the multi-layer part lay-up in order to compress and cure the plies, thereby forming a rigid structure.

Pressure is applied to the lay-up using a technique referred to as "vacuum bagging" wherein the lay-up part is placed inside a bag within which a vacuum is drawn. The vacuum within the bag results in the application of compaction pressure to the lay-up which assists in consolidating the plies. The bag vacuum also extracts moisture, solvents and volatiles from the curing composite, and urges the resin to both flow and be absorbed in the lay-up without hydraulic lock. Heat is simultaneously applied to the lay-up by placing the bagged part in an oven or autoclave.

In order to prepare a lay-up for vacuum bagging the part lay-up is placed on a tool base, and a number of layers of material are applied over the lay-up in a sequence referred to as a bagging schedule, following which a bag is placed over a part and sealed to the tool base. The vacuum bags are subject to tearing and the material used to seal the bags to the tool base is subject to leakage or even failure, in which event the bag vacuum is lost. In order to protect against bag or seal failure, part lay-ups are sometimes "double bagged". Double bagging involves placing a first, inner bag over the lay-up which is then sealed to the tool base. A second, outer bag is placed over the inner bag and is also sealed to the tool base. This double bagging technique is time consuming because two bags must be separately formed, trimmed to dimension and sealed. An inordinate amount of sealing area is required which may pose difficulties where the surface area on the tool provided for the seal is relatively small. In order to overcome this problem, in some cases the surface area of the tool can be made larger, but this solution results in tooling that uses more material, has increased weight and greater tool mass. The greater tool mass increases the time required to heat the tool to temperature, thereby increasing the overall cure cycle time.

From the forgoing, it can be appreciated that the prior method of double bagging lay-up parts is both time consuming and requires additional materials. Accordingly, there is a need for a double bag and a vacuum bagging method that overcomes these problems. The present invention is directed towards satisfying this need.

SUMMARY OF THE INVENTION

According to one aspect of the invention, a method is provided for forming a composite part such as a plastic laminate, comprising the steps of forming inner and outer bags; attaching the inner and outer bags to form a double bag assembly; placing the bag assembly over a tool holding the composite part; sealing the bag assembly to the tool; and, drawing a vacuum in the inner and outer bags to compact part. The inner and outer bags are attached by any of various bonding techniques such as ultrasonic welding, heat sealing or introducing an adhesive between the bags. The bags are attached at spaced apart locations. Preferably in central areas of the bags. The width of the outer bag is greater than the width of the inner bag, creating an overlap of opposite edges of the outer bag over those of the inner bag. After attachment of the inner and outer bags, the double bag assembly is placed over the part and sealed to the tool using a pair of seals which engage the outer edges of the inner and outer bags, respectively. The width of the inner and outer bags can be trimmed to an exact size either before the double bag assembly is placed over the tool or after the assembly has been sealed to the tool.

According to another aspect of the invention, a method is provided for manufacturing a double bag for use in vacuum bagging a composite part, comprising the steps of: forming a first flexible sheet having a width; forming a second flexible sheet having a width less than the width of the first sheet; pre-aligning the first and second relative to each other; and, attaching the first and second sheets together at spaced apart locations. The sheets can be formed by cutting sheet material to a width of pre-selected dimensions. The sheets are attached to each other by bonding techniques such as welding, heat sealing or with the use adhesive. The double bag may be produced in high volume by drawing sheet material from each of two rolls, bringing the sheet materials into face to face relationship, bonding the sheets together at spaced apart locations and cutting the bonded sheets to a desired bag length.

According to another aspect of the invention, a method of vacuum bagging a composite part is provided, comprising the steps of: forming an integral double bag; placing the integral double bag over the part; and sealing the double bag to a tool holding the part. The double bag is formed by cutting first and second sheets of the flexible material to first and second widths, respectively where the first width is greater than the second width, and then joining the first and second sheets to each other.

According to still another aspect of the invention, a double bag is provided for vacuum bagging a composite part held on a base, comprising: a first sheet of flexible material having a width and defining a first bag; and, a second sheet of flexible material having a width less than that of the first sheet and defining a second bag, wherein the first and second sheet are joined together to maintain the sheets in pre-aligned relationship to each other. The first and second sheets preferably include spaced apart, opposite edges defining the respective width of the sheet, wherein the opposite edges of the first sheet overlap the corresponding edges of the second sheet substantially equally. The first and second sheets each include spaced apart, opposite edges equidistant from a common centerline so that the first sheet is centered relative to the second sheet. The first and second sheets are integrally joined together by a plurality of spaced apart bonds, preferably located in central regions of the first and second sheets, which maintain the sheets in pore-aligned relationship.

An important advantage of the invention resides in a double bag that is integrally formed so that it may be installed as a bag assembly over the lay-up part. Because the inner and outer bags are pre-assembled in and pre-aligned relationship, the double bag assembly may be quickly aligned over the tool base and sealed. Also, pre-alignment of the sheets forming the inner and outer bags results in less trimming of bag edges after placement on the tool base and reduces the amount of area on the tool base required for bag seals.

Various additional objects, features and advantages of the present invention can be more fully appreciated with reference to the detailed description and accompanying drawings that follow.

BRIEF DESCRIPTION OF THE DRAWINGS

FIG. 5 is a diagmratic view of equipment used to perform a method for high volume production of the integral double bag of the present invention.

FIG. 6 is a plan view of an integral double bag produced using the method used in FIG. 5.

DETAILED DESCRIPTION OF THE PREFERRED EMBODIMENTS

Figure 1A:
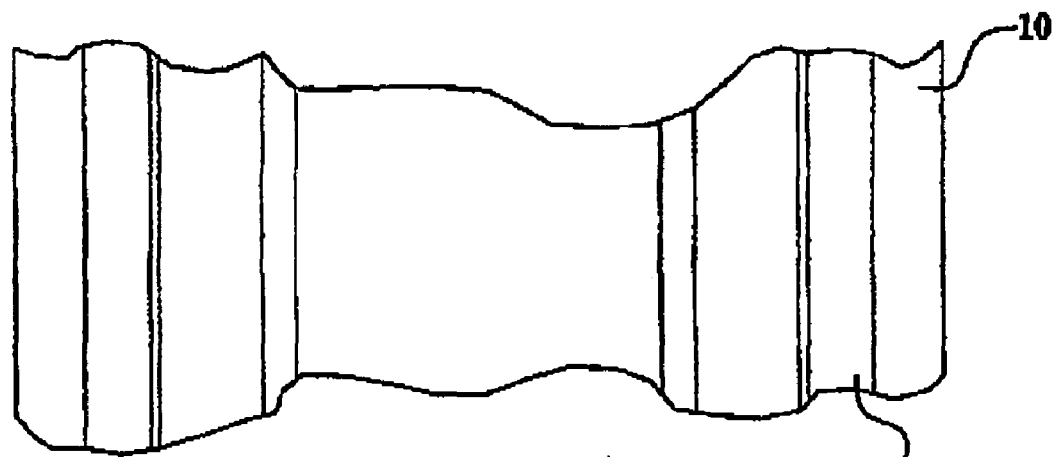
FIG. 1A is a fragmentary, plan view of a lay-up part on a tool base covered by a double vacuum bag according to the prior art.
Figure 1B:
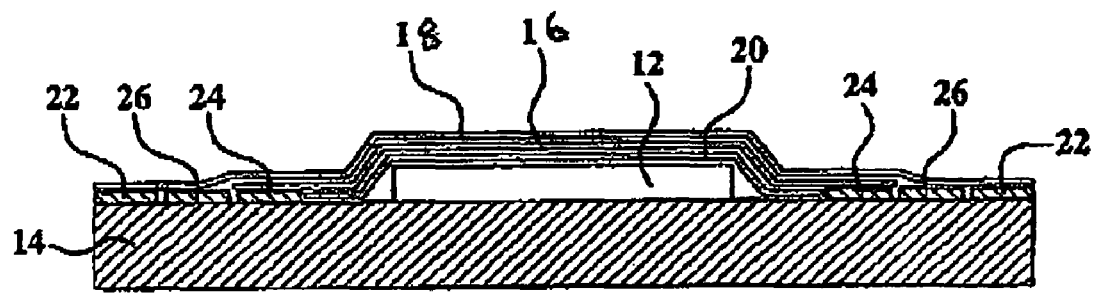
FIG. 1B is a transverse cross section of the assembly shown in FIG. 1A.

FIGS. 1A and 1B show a prior art arrangement for vacuum bagging a composite part which may comprise, for example, a plastic laminate lay-up part 12. The part 12 is mounted on a tool base 14 and is typically covered with various relief films, peel plies and breather layers. In the illustrated example, only a breather ply 20 is shown for sake of simplicity. The breather layer 20 is used to maintain a "breather" path throughout an overlying, inner bag 16 to a vacuum source (not shown) so that air and volatiles can escape and continuous pressure can be applied to the part 12. The breather layer 20 normally comprises a synthetic fiber material and/or any fiberglass fabric which extends past the outer edges of the part 12. As previously indicated, a release film or peel ply (not shown) may be placed over the part 12, followed by a bleeder which absorbs the resin from the part 12 and a separator layer (not shown) which functions to resist or prevent resin flow.

The peripheral edges of the inner bag 16 are sealed to the tool base 14 by means of an adhesive seal 24 in the form of a strip that may comprise, for example, zinc chromate. Seal 24 is commercially available in roll form as "peel and stick" tape which is applied first to the tool base 14, following which an upper, non-adhesive layer is peeled away to reveal an adhesive that adheres to the bottom side of the inner bag 16 to form an air tight seal.

An outer bag 18 overlies the inner bag 16 and is attached to the tool base 14 by means of a second seal 22, also in the form of an adhesive strip of zinc chromate. A breather strip 26 is placed over the tool base 14 between seals 22 and 24. Vacuum ports (not shown) are installed in the inner and outer bags 16, 18 to allow air to be evacuated from each of the bags 16, 18.

The prior art double bag construction described above reduces the possibility of a vacuum failure due to tearing of the bag material or loosening of the seals, since if either of the bags 16, 18 fails, the other bag maintains the necessary compaction pressure produced by the remaining bag vacuum. The forgoing double bag construction, while effective in reducing the possibility of vacuum loss within the bag, is particularly time consuming to setup and install, and requires a considerable amount of space on the tool base 14 around the part 12 in order to be effectively sealed. In part, this is because each of the bags 16, 18 must be separately cut, registered and installed on the tool base in multiple operations. For example, after the breather ply 20 is installed, a sheet of bag material forming the inner bag 16 is placed over the tool base and then adhered to the inner seals 24. Next, an operator must trim the outer edges of the inner bag 16 to size. Then, a second sheet of bag material forming the outer bag 18 is placed over the tool base, overlying the inner bag 16. The edges of the outer bag 18 are adhered to the outer seals 22, following which the outer edges of the bag material must be trimmed to the desired dimensions.

Figure 2:
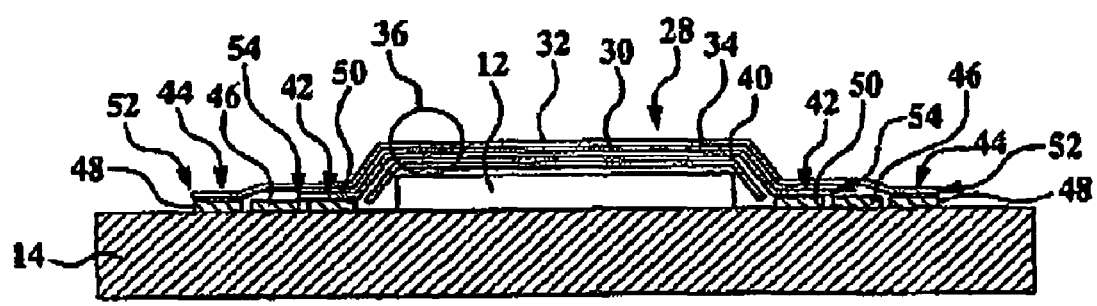
FIG. 2 is a cross sectional view similar to FIG. 1B, but showing an integral double bag in accordance with the present invention.
Figure 3:
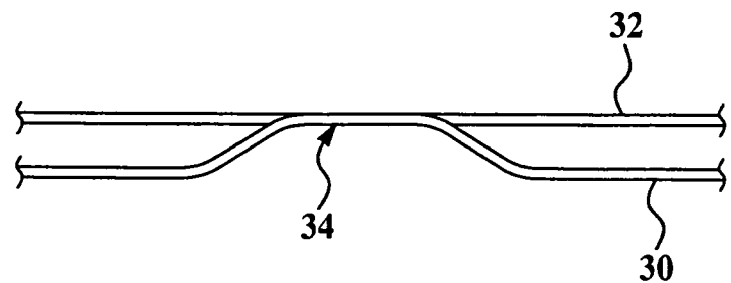
FIG. 3 is an enlarged, fragmentary view of the area surrounded by the dotted line designated by the numeral 36 in FIG. 2.
Figure 4:
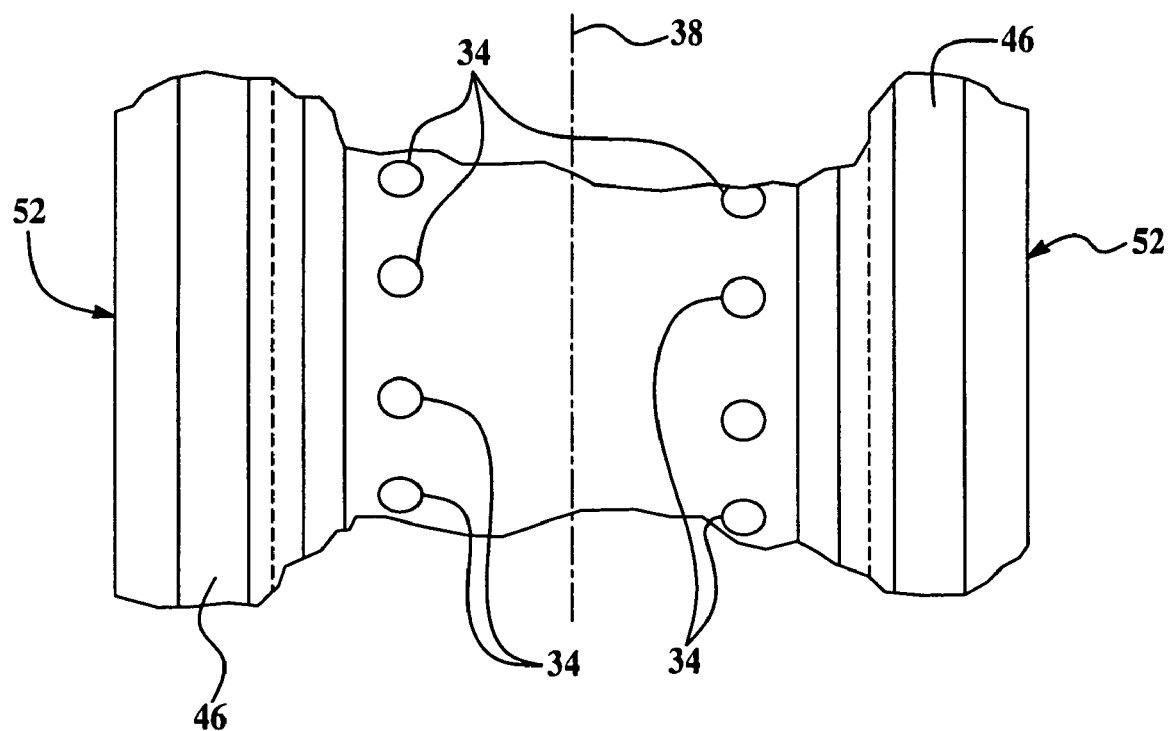
FIG. 4 is a fragmentary, plan view of the bagged lay-up assembly shown in FIG. 2.

Referring now to FIGS. 2-4, the present invention provides an integral double bag construction and bagging method in which an integral double bag 28 is formed from inner and outer bags 30, 32 that are attached to each other by a plurality of spaced apart bonds 34. These attaching bonds 34 are formed between the opposing inner faces of the bag sheet material and preferably located in central regions of the bags 30, 32, spaced inwardly from the outer edges of the bags. In the illustrated example, the bonds 34 are aligned in two spaced apart rows (FIG. 4) in which the individual bonds 34 in each row are also spaced apart. This spacing arrangement allows air to quick freely flow within the space formed between bags 30, 32 yet holds the two bags 30, 32 in precise registration relative to each other while not interfering with the seals that attach the outer edges 42, 44 to the tool base 14. In effect, the attachment bonds 34 function to prealign the edges of the inner and outer bags. The bonds 34 may be formed by ultrasonic welding or heat sealing, for example in which small areas of the sheet material forming bags 30, 32 are brought into contact and effectively melted together. Alternatively, the bonds 34 may be formed by the introduction of adhesive material between bags 30, 32.

Each of the bags 30, 32 is formed from a sheet of flexible material such as nylon, kapton, or PVA (polyvinyl alcohol) for example. The sheets may be first trimmed to their final width dimensions, following which the sheet forming the inner bag 30 is placed in registered, face-to-face contact with the sheet forming the outer bag 32. The longitudinal center lines of bags 30, 32 are aligned before they are bonded so that the outer edges 54 of the inner bag 30 are equally spaced from the corresponding outer edges 52 from the outer bag 32. Thus, it may be appreciated that when the bag assembly 28 is installed over the part 12 onto the tool base 14, the width dimensions of the inner and outer bags 30, 32 have been pre-cut to final dimensions. If desired, the edges 50, 52 of the double bag 28 can be cut to final dimensions after the bonds 34 are formed, but prior to installing the bag 28 on the base 14.

After the integral double bag 28 is formed as described above, a breather ply 40 is installed over the part 12, but unlike the breather ply 20 used in the prior art method (FIGS. 1A, 1B), the outer edges 35 of the breather ply 40 are shorter owing to the fact that an inner seal 50 which secures the outer margins 52 of the inner bag 30 are positioned more closely to the part 12. An outer seal 48 bonds and seals the outer margin 44 of the outer bag 32 to the tool base. Another breather ply 46 covers the tool base 14 between the inner and outer seals 42, 48. The widths of the inner and outer seals 42, 48 as well as the width of the breather ply 46 are reduced in dimension compared to the corresponding components in the prior art (FIGS. 1A, 1B) and are more closely inwardly spaced, toward the part 12. As a result, a narrower tool base 14 may be utilized, resulting in materials savings and reduction in oven cycling times since the thermal mass of the tool base 14 is reduced.

The reduction in width of the seals 42, 48 and the breather layer 46 as well as their placement closer to the part 12 is a result of the fact that the width dimension of the bags 30, 32 are effectively pre-determined before the bag assembly 28 is disposed over the tool base. In addition, the relative spacing between the outer edges 52, 54 of the inner and outer bags 30, 32 is likewise pre-determined since the bag assembly 28 is assembled as an integral unit before it is placed on the tool base 14.

In use, after the breather layer 40 and other layers have been placed over the part 12 according to the applicable bagging schedule, the pre-assembled double bag 28 is disposed over the part 12 and the margins 42 of the inner bag 30 are pressed onto the inner seals 50 which seal the inner bag 30 to the base 14. Then, the outer margins 44 of the outer bag 32 are brought into contact with the outer seal 40 in order to seal the outer bag 32 to the base. Vacuum ports (not shown) may be pre-installed in the sheets forming the inner and outer bags 30, 32 before the integral double bag is placed on the tool base. Alternatively, depending upon the installation, the vacuum ports may be installed in the inner and outer bags 30, 32 after the integral double bag 28 has been placed on the tool base 14.

Only two sides of the integral double bag 28 are shown in Figures in 2-4. The remaining two ends of the double bag 28 may be sealed to the tool base 14 in the same manner as described above, or using the and trimming technique described with reference to FIGS. 1A and 1B.

The integral double bag 28 may be manually fabricated for "one-off" or low volume production. However, the integral double bag construction of the present invention lends itself to high volume production, and in this connection reference is now made to FIGS. 5 and 6. The sheet material from which the double bag 28 is made may be fed from rolls 56, 58 of material in which the width of one roll 56, 58 is less than the other. The rolls 56, 58 are aligned such that the sheets are centered a common centerline 38. The sheets 60, 62 are fed through rollers 64 which bring the faces of the sheets together. A bonding machine, such as an ultrasonic welder 66, forms a series of bonds 34 along the length of the sheets 60, 62 as the latter are fed as a bonded double sheet to a sheer 68 which cuts the final double bag 28 to the desired length.

Figure 7:
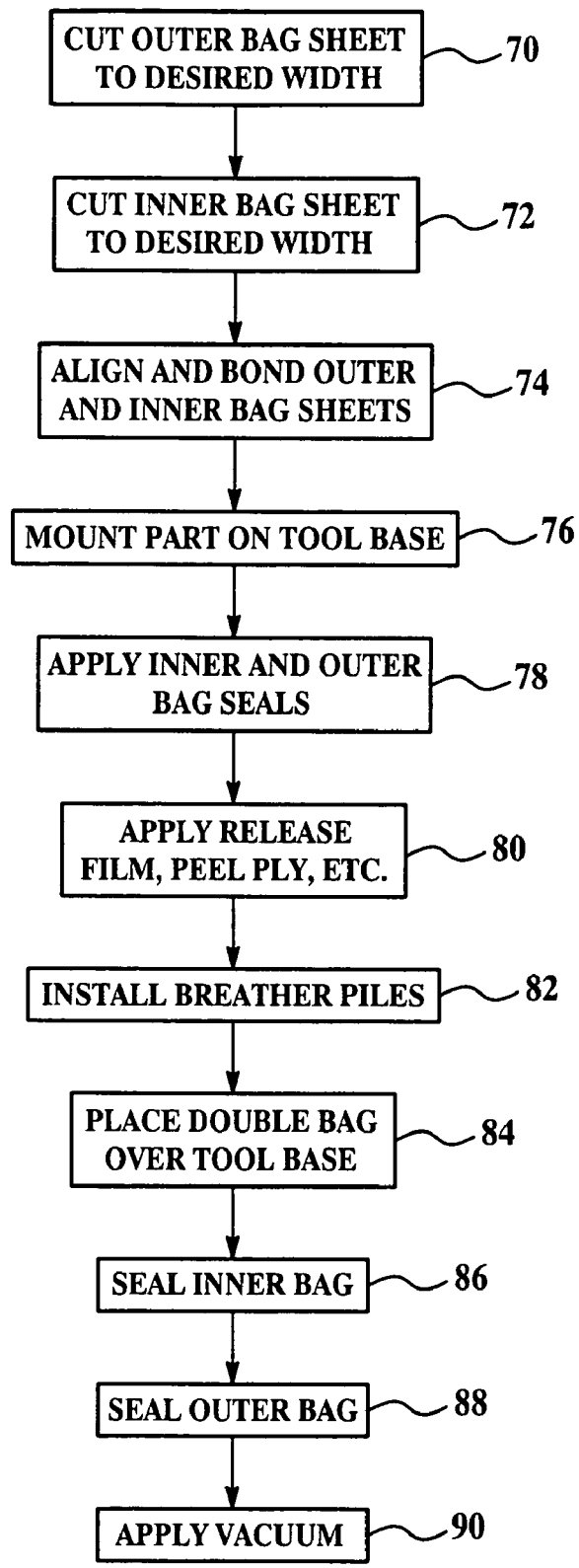
FIG. 7 is a flow chart showing the basic steps of a method for forming a composite part using the double bagging method of the present invention.

Reference is now made to FIG. 7 which depicts the basic steps of a double bagging method using the integral double bag of the present invention. At step 70, a sheet of material defining the outer bag 32 is cut to the desired width. A second sheet of material defining the inner bag 30 is cut to the desired width at step 72. Then, at step 74, the two sheets that have been cut to the width are aligned along a common centerline and then bonded together at spaced apart, central locations as previously described.

The integral double bag 28 having been pre-assembled for use in vacuum bagging a particular part 12, the part 12 is mounted on the tool base 14 at step 76. Inner and outer seals 42, 48 are placed on the tool base, as shown in step 78. Release films, bleeder plies, peel plies, etc are then placed over the part according to a bagging schedule that will depend upon the nature of the particular part 12 being formed. Next, at step 82, breather plies 40, 46 are installed, following which the double bag 28 is placed on the tool base 14 covering the part 12. The outer margins 42 of the inner bag 30 are pressed onto the inner seal 50, thereby sealing the inner bag 30 at step 86.

Similarly, as shown at step 88, the outer margins 44 of the outer bag 32 are pressed onto the outer seals 48, thereby sealing the outer bag 32. Not shown in FIG. 7 is the installation of vacuum ports in the inner and outer bags 30, 32 respectively. The integral double bag 28 having been installed on the tool base 14 and connected with a suitable vacuum source, vacuum is applied at step 90 which creates a vacuum inside both the inner and outer bags 30, 32 respectively, producing the necessary compaction pressure which both forces the plies of the part 12 together and urges resin to flow through the plies.

Although this invention has been described with respect to certain exemplary embodiments, it is to be understood that the specific embodiments are for purposes of illustration and not limitation, as other variations will occur to those of ordinary skill in the art.

What is claimed is:

1. A method of forming a composite part from an uncured layup, comprising the steps of:
   (A) forming an inner bag comprising a flexible sheet;
   (B) forming an outer bag comprising a flexible sheet;
   (C) attaching the inner bag to the outer bag to form a double bag assembly, both of said inner and outer bags comprising opposing faces attached immediately adjacent to one another including over a central region of said inner and outer bags;
   (D) placing the bag assembly over a tool holding the composite part;
   (E) sealing each of the bags comprising the bag assembly to the tool, said sealing comprising forming an inner seal between the inner bag and the tool, and forming an outer seal between the outer bag and the tool; and,
   (F) drawing a vacuum in the inner and outer bags, said vacuum causing compaction pressure to be transferred by said bags to said composite part.

2. The method of claim 1, wherein:
   step (A) includes forming the inner bag to have a width, and
   step (B) includes forming the outer bag to have a width greater than the width of the inner bag.

3. The method of claim 1, further comprising the step of:
   (G) placing the outer bag over the inner bag before step (C) is performed.

4. The method of claim 1, wherein step (C) is performed by welding parts of the inner bag to the outer bag.

5. The method of claim 1, wherein step (C) is performed by introducing an adhesive between the inner and outer bags.

6. The method of claim 1, further comprising the step of:
   (G) introducing a breather layer between the inner and outer seals.

7. The method of claim 1, further comprising the step of:
   (G) aligning the inner and out bags relative to each other before step (C) is performed.

8. A method of vacuum bagging an uncured layup to form a composite part, comprising the steps of:
   (A) forming an integral double bag, said integral double bag comprising an outer bag comprising a first flexible sheet attached to an inner bag comprising a second flexible sheet, both of said inner and outer bags comprising opposing faces attached immediately adjacent to one another including over a central region of said inner and outer bags;
   (B) placing the integral double bag over the part; and,
   (C) sealing each of the inner and outer bags to a tool holding the part, said sealing comprising forming an inner seal between the inner bag and the tool and forming an outer seal between the outer bag and the tool.

9. The method of claim 8, wherein step (A) includes:
cutting said first and second sheets to first and second widths, respectively, wherein the first width is greater than the second width, and
joining the first and second sheets to each other.

10. The method of claim 9, wherein step (C) in performed by:
sealing edges of the second sheet to the tool, and
then, sealing the edges of the first sheet to the tool.

11. A method of forming a composite part from an uncured layup, comprising the steps of:
(A) forming an inner bag comprising a flexible sheet;
(B) forming an outer bag comprising a flexible sheet;
(C) attaching the inner bag to the outer bag to form a double bag assembly, said double bag assembly consisting of said inner and outer bags attached immediately adjacent to one another;
(D) placing the bag assembly over a tool holding the composite part;
(E) sealing each of the bags comprising the bag assembly to the tool, said sealing comprising forming an inner seal between the inner bag and the tool, and forming an outer seal between the outer bag and the tool; and,
(F) drawing a vacuum in the inner and outer bags, said vacuum causing compaction pressure to be transferred by said bags to said composite part.

12. The method of claim 11, wherein:
step (A) includes forming the inner bag to have a width, and
step (B) includes forming the outer bag to have a width greater than the width of the inner bag.

13. The method of claim 11, further comprising the step of:
(G) placing the outer bag over the inner bag before step (C) is performed.

14. The method of claim 11, wherein step (C) is performed by welding parts of the inner bag to the outer bag.

15. The method of claim 11, further comprising the step of:
(G) introducing a breather layer between the inner and outer seals.

16. The method of claim 11, further comprising the step of:
(G) aligning the inner and out bags relative to each other before step (C) is performed.

* * * * *